(12) United States Patent
Wertenbruch et al.

(10) Patent No.: US 7,873,164 B1
(45) Date of Patent: Jan. 18, 2011

(54) METHOD AND APPARATUS FOR CONFIGURING NETWORK DEVICES

(75) Inventors: Dirk Wertenbruch, San Jose, CA (US); Peter Falk, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2383 days.

(21) Appl. No.: 10/664,264

(22) Filed: Sep. 16, 2003

(51) Int. Cl.
*H04K 1/00* (2006.01)
(52) U.S. Cl. .................................................. 380/255
(58) Field of Classification Search .............. 380/255, 380/257, 41; 713/153; 709/228, 221, 220
See application file for complete search history.

(56) References Cited

U.S. PATENT DOCUMENTS 6,012,088 A * 1/2000 Li et al. ...................... 709/219
6,351,773 B1 * 2/2002 Fijolek et al. ............... 709/228

OTHER PUBLICATIONS

Cisco Systems, Inc., "Cisco Router Web Setup Tool," 2001, Product Bulletin No. 1299, pp. 1-2.
Cisco Systems, Inc., "Cisco Router Web Setup Tool (CRWS) Simple Setup for Cisco SOHO Series and 800 Series Broadband Routers," 1992-2002, pp. 1-4.

Cisco Systems, Inc., Cisco Router WebSetUp Tool, 1992-2002, http://www.cisco.com/warp/public/cc/pd/nemnsw/rtwbto20/index.html, data retrieved Apr. 28, 2004, pp. 1-2.
Cisco Systems, Inc., "Getting Started with Cisco Configuration Express," 2000, pp. 1-4.
Cisco Systems, Inc., "Configuration Express," 1992-2000, http://www.cisco.com/warp/public/779/servpro/operate/ce/, data retrieved Apr. 28, 2004, pp. 1-2.

* cited by examiner

*Primary Examiner*—Ellen Tran
(74) *Attorney, Agent, or Firm*—Hickman Palermo Truong & Becker LLP

(57) ABSTRACT

A method for authenticating a network device includes determining that a network link that uses a primary signaling technology and a secondary signaling technology is coupled to the network device; obtaining, using the secondary signaling technology, a unique link identifier that is associated with the network link using the secondary signaling technology; establishing the unique link identifier as a unique device identifier; and authenticating the network device to a service provider by communicating the unique device identifier to the service provider over the network link using the primary signaling technology. In one approach, the primary signaling technology is ADSL and the secondary signaling technology is ISDN. The unique link identifier may be an ISDN telephone number for an ISDN line which is obtained using caller ID techniques.

41 Claims, 7 Drawing Sheets

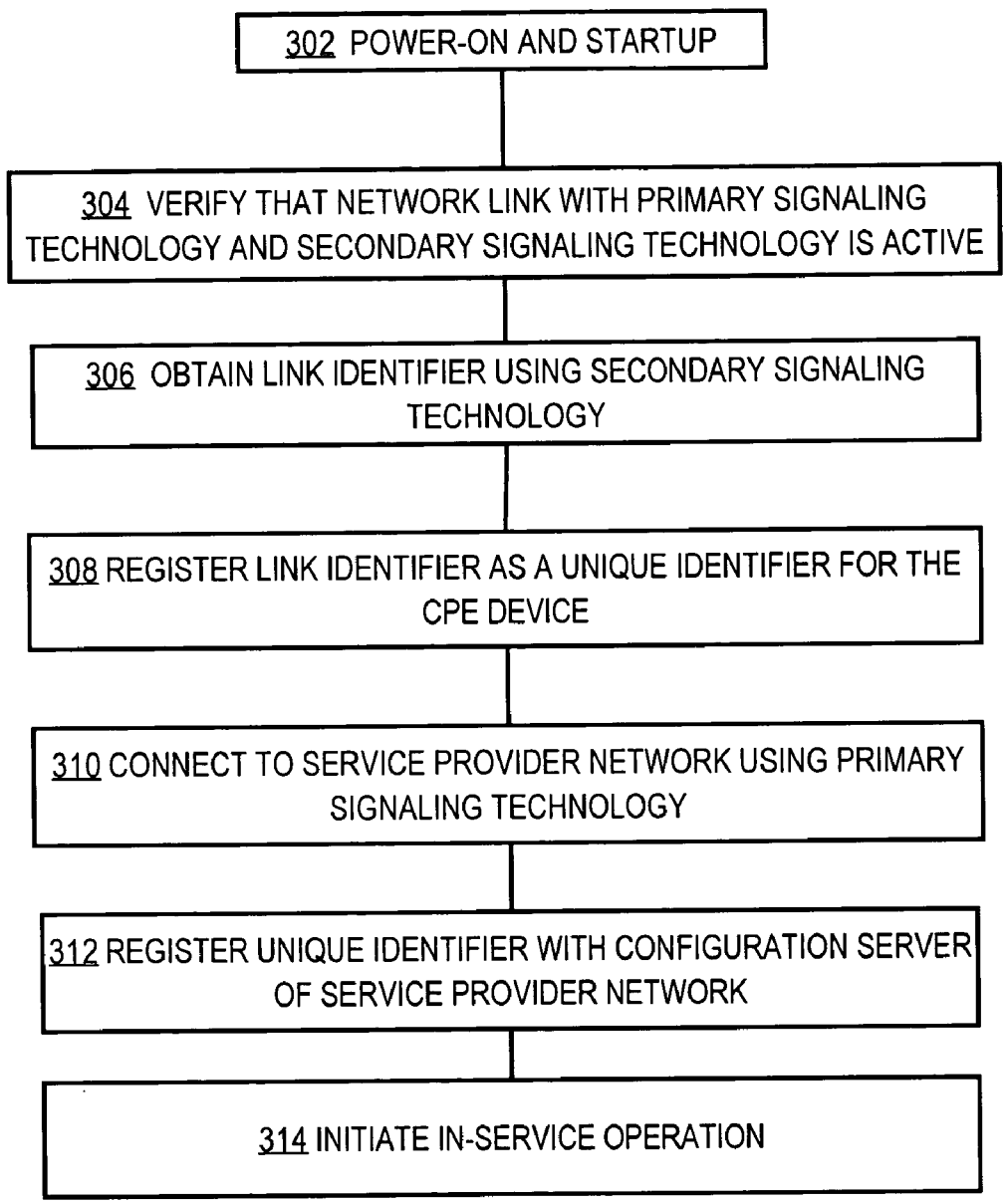

METHOD AND APPARATUS FOR CONFIGURING NETWORK DEVICES

FIELD OF THE INVENTION

The present invention generally relates to configuration for deployment of computer networks. The invention relates more specifically to a method and apparatus for configuring network devices.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Residential and business customers of large-scale broadband network service providers typically access a broadband network using customer premises equipment (CPE) network devices. The CPE devices may include universal broadband routers and residential gateways, the Cisco 800 Series Routers, and others. Information about use of Cisco 800 CPEs for ADSL over ISDN is provided in the document http://www-.cisco.com/en/US/products/hw/routers/ps380/?js=1

In a typical approach, a customer places an order for service with the service provider. In response, the service provider provides a CPE device to the customer, either directly from a stock location of the service provider or indirectly by requesting a vendor or manufacturer to "drop ship" the device from the manufacturer's location to the customer.

Providing Internet service through asynchronous digital subscriber line (ADSL) technology has become particularly popular because ADSL offers high-speed Internet access at a relatively low cost. However, when CPE devices use ADSL communication over integrated services digital network (ISDN) lines, problems arise with respect to configuring the CPE devices for proper operation. Typically, in this context, each CPE device within a class of CPE devices (such as Cisco 800 Series Routers) can be manufactured with slightly different hardware and software options. There is a need to ensure that the configuration that is provided to the device is compatible with the options installed in the device.

Further, many service providers use individual user authentication techniques, such as PPPoE, that require each CPE device to have a unique configuration with parameter values, such as individual username and password, that will support the authentication. A generic or standard configuration will not work in this context. Additionally, for security reasons, only certain classes of users may be allowed to have a particular kind of configuration. For example, assume that John is a teleworker for Company J, and Sue works for Company S; J and S are competitors that do not share confidential information on their networks; the same service provider provides service to John and Sue; and John and Sue use the same type or class of CPE device. If the service provider erroneously gives Sue's individual device configuration to John, then John might be able to access Sue's network. This is undesirable.

For the service provider to provide an individual configuration to a particular device, identification of the CPE device is needed. That is, the service provider needs to receive specific identifying information about the CPE device, from which the service provider can determine that a specific CPE device is located where the service provider expected the customer to receive and use the device. Thereafter, the service provider can provide one or more specific configuration commands or parameter values (an "individual configuration") to the CPE device after it is installed at the customer site, to ensure that the CPE device can properly connect to and use the service provider network.

Several approaches have been available in the past to provide the individual configuration. In one approach, the service provider sends a service technician to the customer premises to manually enter or load the individual configuration. This approach provides manual authentication in the sense that the service technician physically appears at an authorized party's premises and installs the correct configuration there. However, service providers incur significant expense from this approach in comparison to the relatively low cost of the CPE device. Because of these costs, this approach is not practical for deployment of large numbers of devices. Thus, service providers would prefer to eliminate costs associated with a "truck roll" to the customer premises. These costs become excessive when the service provider is attempting to deploy thousands of units to customers.

In a second approach, the customer self-installs the individual configuration in the CPE device. For example, the CPE device can provide a Web server and pre-loaded Web pages that prompt the user to enter various configuration parameter values. This approach can enforce authentication by requiring each user to sign on with a previously distributed username and password. However, this approach is not accepted by some service providers, and is not desirable because users may make errors or may require technical support from the service provider in order to accomplish proper configuration, which imposes costs on the service provider. Management and distribution of passwords also present issues.

In yet another approach, the CPE device is pre-configured with an individual configuration. In this approach, the CPE device arrives at the customer premises with enough information to enable the CPE device to connect to a configuration server. However, the security of this approach is entirely dependent upon perfect logistical execution by the delivery channel. Because delivery services are known to be error-prone, the service provider must track specific CPE devices to ensure that they arrive at the correct location. This is required because if the customer receives and attempts to use a CPE device that has the wrong individual configuration, the device may be unable to work with the service provider's service. This could occur if the customer receives a non-working CPE device and later receives a replacement, exchanges boxes with another customer, receives the wrong box through error by the manufacturer, service provider, or delivery service, etc.

In this context, service providers desire to have a deployment process in which the service provider can verify that a particular CPE device is at a particular customer premises before providing an individual configuration, but such a process is not provided in current approaches. Further, the process should permit the CPE device can obtain an individual configuration automatically without a "truck roll" or other extraordinary intervention by the service provider.

Deutsche Telekom of Germany currently is the largest service provider in the world using ADSL over ISDN for broadband network service. Deutsche Telekom is known to use the ISDN line number in combination with a username for the purpose of authenticating user access to the network. In this approach, the ISDN line number serves as a substitute for a traditional user password. However, in this approach the ISDN line number only authenticates a user, but not a CPE device.

"Caller ID" or "calling party identification" is a known technology in which an end station in the public switched telephone network (PSTN) can request a PSTN switch to provide the telephone number of a calling party. The signaling messages that support Caller ID can be conveyed over ISDN lines. Caller ID can be used by various devices to query a PSTN switch over an ISDN line and thereby obtain a calling line identifier ("CLID"), or calling party number, representing the telephone number that the telephone company uses for the ISDN line.

In another approach that is believed to be practiced by Bintec of Germany, configuration is provided exclusively over ISDN to CPE devices. In this approach, a configuration device places a call over an ISDN line to the CPE device. The configuration device then provides a device configuration over the ISDN line. This approach has the disadvantage that an ISDN call is required for each CPE device.

Based on the foregoing, there is a clear need in this field for an approach that provides automatic deployment of CPE network devices at specific remote locations, without user intervention. There is a specific need for an approach that provides for individual authentication of a CPE device without user intervention. There is a particular need for such an approach in the context of ADSL, because millions of ADSL lines have been installed worldwide and thus the user base is very large.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates a second embodiment of a method for configuring network devices;

DETAILED DESCRIPTION OF THE PREFERRED EMBODIMENT

Figure 1:
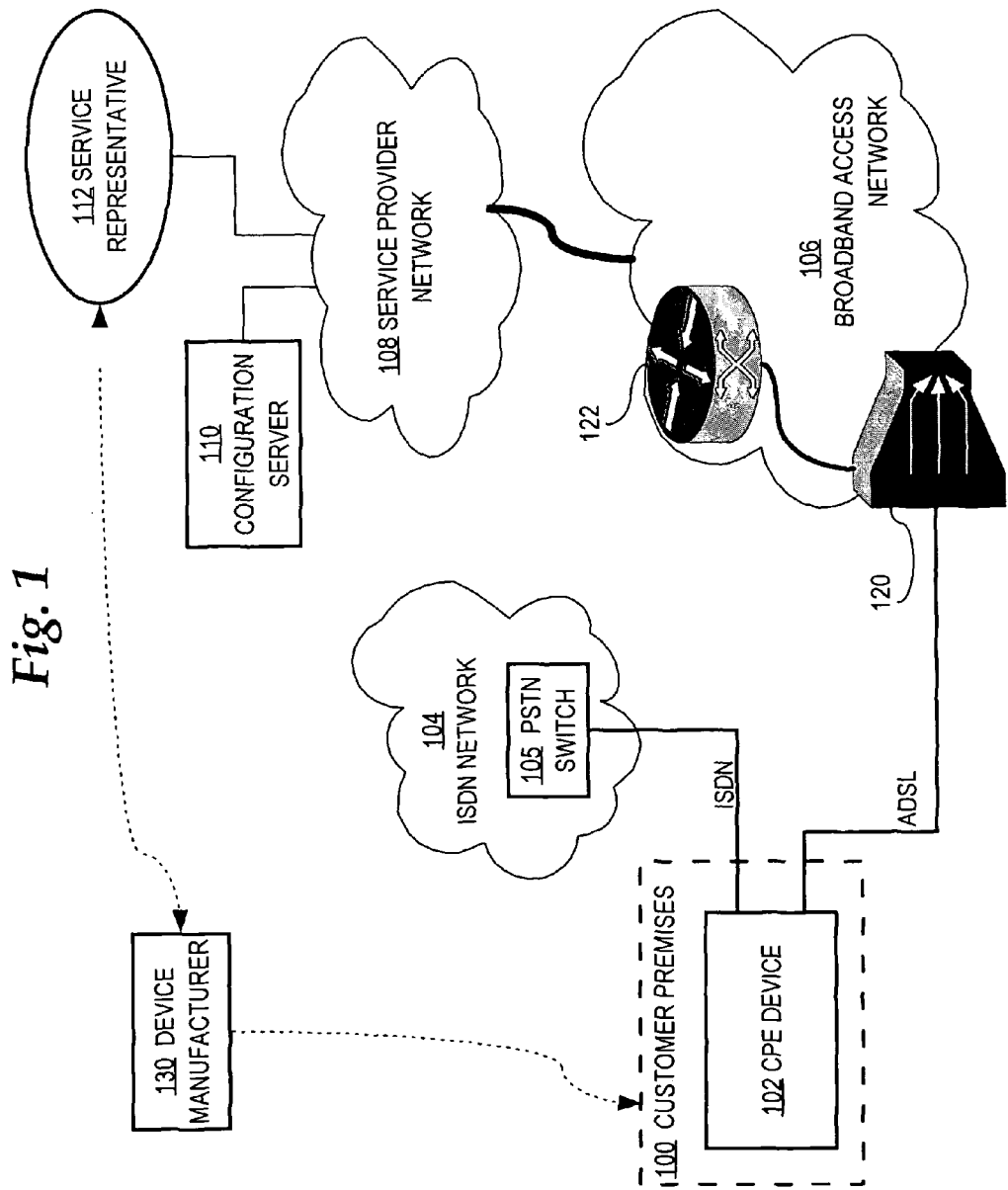
FIG. 1 is a block diagram that illustrates a network context in which an embodiment may be used.

A method and apparatus for configuring a network device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Method of Configuring Network Devices |
| 3.0 | Implementation Mechanisms-Hardware Overview |
| 4.0 | Extensions and Alternatives |

1.0 General Overview

The needs identified in the foregoing Background, and other needs and objects that will become apparent for the following description, are achieved in the present invention, which comprises, in one aspect, a method for identifying a network device includes determining that a network link that uses a primary signaling technology and a secondary signaling technology is coupled to the network device; obtaining, using the secondary signaling technology, a unique link identifier that is associated with the network link using the secondary signaling technology; establishing the unique link identifier as a unique device identifier; and authenticating the network device to a service provider by communicating the unique device identifier to the service provider over the network link using the primary signaling technology. In one approach, the primary signaling technology is ADSL and the secondary signaling technology is ISDN. The unique link identifier is an ISDN telephone number for an ISDN line that is obtained using caller ID techniques.

Thus, the disclosed techniques include a method for authenticating a network device before providing an individual configuration. The method enables a service provider to verify that a particular device is online and active at an expected line location. After authentication, a basic device configuration or individual device configuration can be provided. The configuration information can be stored in a database and retrieved based on using the unique link identifier as a key, or as a reference to a key. Because authentication is performed, the service provider is assured that an individual device configuration is provided only to a device that is authorized to have that device configuration.

According to one feature of this aspect, the method further comprises receiving a configuration from the service provider. In another feature, the secondary signaling technology is integrated services digital network (ISDN). In yet another feature, the secondary signaling technology is ISDN, and the unique link identifier associated with the secondary signaling technology is a telephone number associated with an ISDN line.

In still another feature, the secondary signaling technology is ISDN, and the obtaining step comprises obtaining a telephone number associated with the ISDN line using a caller ID function. In another feature, the network device is a residential broadband router, and the primary signaling technology is asynchronous digital subscriber line (ADSL).

In yet another variation the network device is a residential broadband router, the primary signaling technology is ADSL, the secondary signaling technology is ISDN, and the unique link identifier associated with the secondary signaling technology is a telephone number associated with the ISDN line. In another variation, registering the network device with a service provider comprises using the ADSL line to connect to a Cisco Intelligent Engine 2100 (IE2100) device associated with the service provider, and providing the unique device identifier to the IE2100.

Alternatively, registering the network device with a service provider comprises using the primary signaling technology to connect to a configuration server associated with the service provider, and providing the unique device identifier to the configuration server.

In another aspect, the invention provides a method of configuring a broadband customer premises network device that is communicatively coupled to an ISDN network using an ISDN line and to a broadband network using an ADSL line, the method comprising the computer-implemented steps of obtaining, using the ISDN line, an ISDN telephone number uniquely associated with the ISDN line; establishing the ISDN telephone number as a unique identifier of the broadband customer premises network device; and registering the network device with a broadband network service provider by providing the unique identifier to the service provider using the ADSL line. According to one feature, the method further comprises the steps of receiving a configuration from the service provider.

In another feature, the obtaining step comprises obtaining a telephone number associated with the ISDN line using a caller ID function. In still another feature, the step of registering the network device with the service provider comprises using the ADSL line to connect to a Cisco Intelligent Engine 2100 (IE2100) device associated with the service provider, and providing the unique device identifier to the IE2100.

In another aspect, the invention provides a method of deploying a network device, comprising receiving a non-configured customer premises equipment (CPE) device at a customer premises; communicatively coupling a network link that uses a primary signaling technology and a secondary signaling technology to the network device; obtaining, using the secondary signaling technology, a unique link identifier associated with the network link; establishing the unique link identifier as a unique identifier of the CPE device; connecting to a network service provider using the primary signaling technology; registering the CPE device with a service provider using the primary network link and the unique device identifier; and receiving, from the service provider, a configuration for the CPE device over the primary network link.

In other aspects, the invention encompasses a computer apparatus and a computer-readable medium configured to carry out the foregoing steps.

2.0 Structural and Functional Overview

For the purpose of illustrating an example context for using embodiments of the invention, FIG. 1 is a block diagram that illustrates a network context in which an embodiment may be used. A customer premises 100 has a customer premises equipment (CPE) network device 102 that may be communicatively coupled to one or more end stations or peripherals, such as telephone 101A, personal computer 101B, etc. In this context, the term "customer" refers to any party that receives network services from a service provider; a customer may be a business, an individual, a group, etc. In one embodiment, CPE device 102 is a broadband router, such as one of the Cisco 800 Series Routers from Cisco Systems. Other embodiments may use the Cisco 1700, 2600, or 3600 Series Routers.

CPE device 102 has a network interface 103 that can be communicatively coupled to a network link that supports a primary signaling technology and a secondary signaling technology. In one embodiment, CPE device 102 has an ISDN port 103 that can be communicatively coupled to an ISDN communication line 103B that supports ADSL over ISDN. Thus, in one embodiment, CPE device 102 communicates data using ADSL technology over the ISDN line 103B. The ISDN line 103B terminates at a switch 105 within an ISDN network, which is typically part of the public switched telephone network. Switch 105 may be an AT&T 5ESS switch, for example, or an equivalent. The ISDN line 103B also is coupled indirectly to a broadband access network through a DSL access multiplexer (DSLAM) 120.

DSL traffic within broadband access network is communicated through one or more PPP-over-Ethernet concentrators, ATM switches, and associated devices, which are collectively represented by router 122, to a service provider network 108. A configuration server 110 forms part of the service provider network and can communicate with CPE device 102 through the use of Internet Protocol (IP). Upon power-up, the CPE device contacts the configuration server and obtains configuration information or software updates. An example of a configuration server with this capability is the Cisco Intelligent Engine 2100 (IE2100) from Cisco Systems, Inc., San Jose, Calif. Information about the Cisco IE2100 is provided in the document: http://www.cisco.com/warp/public/cc/pd/nemnsw/2100/prodlit/?js=1

A service representative 112 may interact with the configuration server 110 for the purpose of fulfilling requests for service from the customer premises 100. A device manufacturer 130 is responsible for making CPE devices 102 and providing or shipping the devices either directly to customer premises 100 or to the service provider, which later provides a device to a customer.

For purposes of illustrating a clear example, FIG. 1 and its elements are shown in greatly simplified form. A practical embodiment may include additional elements. For example, there may be any number of customer premises 100 and CPE devices 102. Networks 104, 106, 108 may each include numerous elements of infrastructure for supporting communication within the networks.

Within the context of FIG. 1, a method of configuring a network device may be performed. In general, embodiments provide a solution in which the CPE device acquires a unique identifier or number, which a central management station associated with the service provider can use to authenticate the device. For example, in the context of ADSL over ISDN, every ISDN line associated with each remote customer has an individual ISDN number assigned to it. In the solution proposed herein, a CPE device has software instructions that cause the device to read the ISDN number from the ISDN channel and use the ISDN number as an individual authentication variable for the CPE device. By sending the ISDN number to a deployment server, such as the Cisco IE2100, an individual authentication of a device per user is achieved without the burden of a truck roll, a tracking process or a complicated logistics process.

Figure 2:
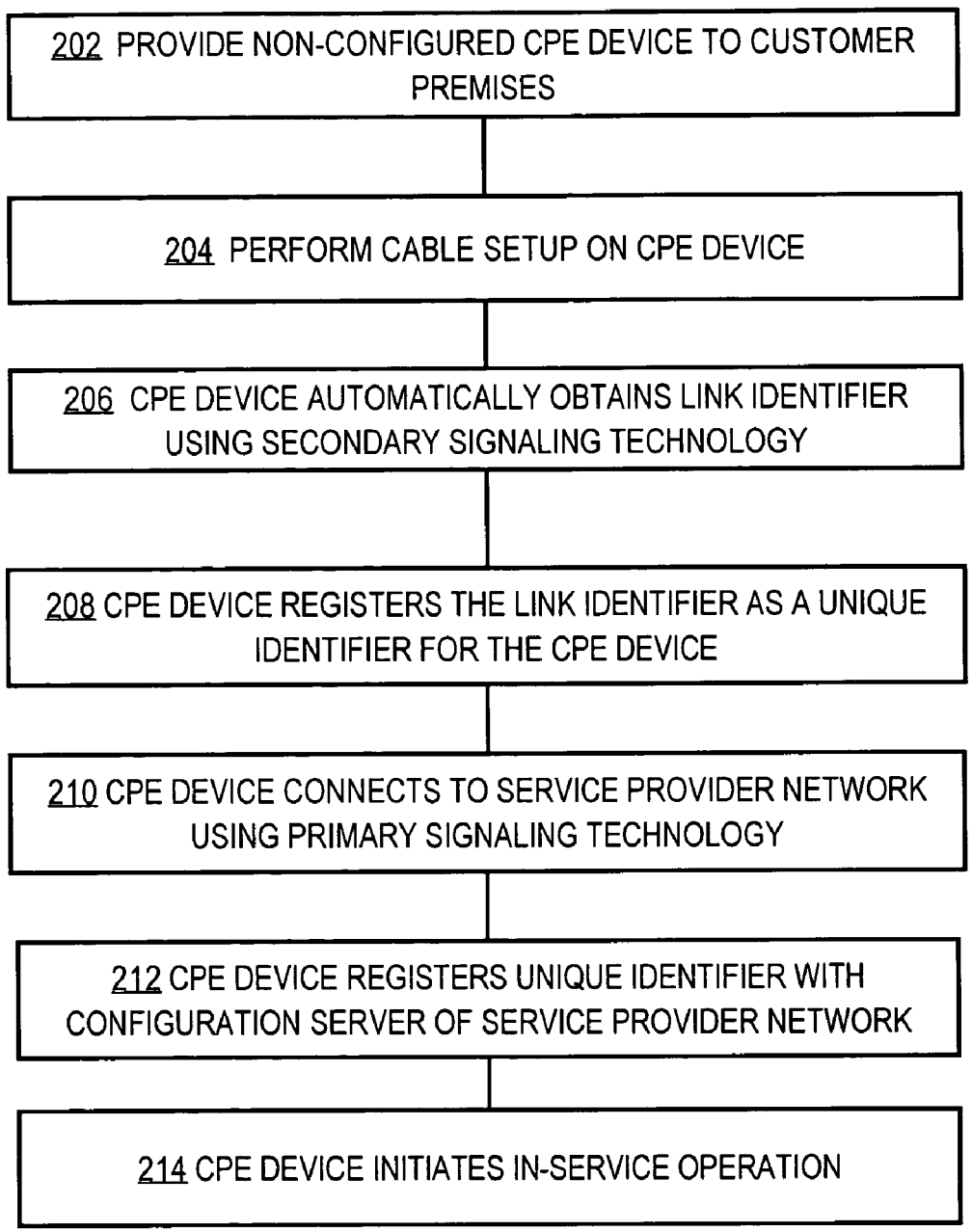
FIG. 2 is a flow diagram that illustrates one embodiment of a method for configuring network devices.

FIG. 2 is a flow diagram that illustrates one embodiment of a method for configuring network devices. FIG. 2 illustrates a process from the perspective of a service provider. Further, for the purpose of describing a clear example, FIG. 2 is described herein with reference to the context of FIG. 1; however, the process of FIG. 2 is applicable to other contexts and embodiments.

In block 202, a non-configured CPE device is provided to a customer premises. For example, a service provider requests device manufacturer 130 to drop-ship CPE device 102 directly to customer premises 100. Alternatively, at some prior time, manufacturer 130 ships one or more CPE devices 102 to a storage location associated with the service provider, and block 202 involves the service provider shipping the CPE device from the storage location to the customer premises 100.

As part of block 202, or at a prior time, a generic configuration is stored in non-volatile memory of the CPE device. The generic configuration includes a fixed or static network address of a configuration server in the service provider network. For example, the generic configuration that is applied to CPE device 102 before shipment to a customer includes a fixed IP address for configuration server 110. Thus, the CPE device arrives at the customer with sufficient configuration information to enable it to reach the configuration server, but not to perform any other action in the network or to reach needed resources.

In block 204, cable setup is performed on the CPE device. Typically block 204 is performed by an end user or other individual associated with the customer premises 100 and involves connecting cables from the CPE device to landlines that provide a network link that supports a primary signaling technology and a secondary signaling technology. The primary signaling technology and secondary signaling technology enable the CPE device to reach different networks. In one embodiment, the primary signaling technology is ADSL and enables the CPE device to reach and use an ADSL broadband access network, and the secondary signaling technology is ISDN and is associated with an ISDN network in the PSTN. However, other networks may be used. Block 204 may also involve applying power to the CPE device after cabling is complete.

In block 206, the CPE device automatically obtains a network link identifier using the secondary signaling technology. Block 206 involves the CPE device requesting or obtaining a unique identifier that is associated with the network link using the secondary signaling technology. For example, when the secondary signaling technology is ISDN, then when CPE device 102 is powered up, based on its generic configuration, the CPE device exchanges messages with PSTN switch 105. As part of the message exchange, using caller ID techniques, CPE device 102 can request and receive from the PSTN switch a calling line identifier ("CLID") containing an ISDN telephone number that is uniquely associated with the ISDN line 103B.

In one approach, when the CPE device is a Cisco 800 Series Router, a Cisco CLI command "q931_debug" or the equivalent is provided. When executed by the CPE device, the command causes the CPE device to issue Q.931 debug messages on the signaling channel or "D-channel" of the ISDN phone line to PSTN switch 105. In response, the PSTN switch provides a message that contains the calling line identifier of the ISDN phone line on which the debug request arrived, which is the same ISDN phone line connected to the CPE device and used for ADSL over ISDN service. Q.931 is an ISDN signaling protocol defined by the International Telecommunications Union (ITU). Table 1 presents an example of output that is provided by the switch in response to a debug request. In an implementation of the techniques herein, the CPE parses this response to identify the calling line identifier.

TABLE 1

ISDN Q931 DEBUG OUTPUT

Router#
*Mar 16 04:16:17.980: ISDN Se1/0:23: RX callref
= 0x06
*Mar 16 04:16:17.980:                 Bearer Capability i = 0x8090A2
*Mar 16 04:16:17.984:                 Channel ID i = 0xA98393
*Mar 16 04:16:17.984:                 Progress Ind i = 08283 -
Origination address is non-ISDN
*Mar 16 04:16:17.988:                 Calling Party Number i = 0x2183,
'8315552109', Plan:ISDN,
Type:National
*Mar 16 04:16:17.992:                 Called Party Number i = 0xC1,
'8315552312', Plan:ISDN,
Type:Subscriber(local)
*Mar 16 04:16:18.024: ISDN Se1/0:23: TX -> CALL_PROC pd = 8
callref = 0x8006
*Mar 16 04:16:18.024:                 Channel ID i = 0xA98393
*Mar 16 04:16:18.028: ISDN Se1/0:23: TX -> CONNECT pd =8
callref = 0x8006

TABLE 1-continued

ISDN Q931 DEBUG OUTPUT

*Mar 16 04:16:18.092: ISDN Se1/0:23:RX < -CONNECT_ACK pd = 8
callref = 0x06

In this example, the calling party number "8315552109" is provided in the output. The CPE device may parse the output and identify the correct number by searching the output text for the string "Calling Party Number." Similar approaches may be used with networks that use Q.921 messaging.

The ISDN telephone number is equivalent to an ITU E.164 address for the ISDN line. Q.931 protocol messages may be used to obtain the CLID. In alternative embodiments that use other kinds of links and associated networks, similar techniques can be used to obtain an ITU E.164 address or other unique identifier associated with the links.

In block 208, the CPE device registers the link identifier as a unique identifier for the CPE device. The specific steps involved in block 208 may vary depending on the particular CPE device in use. When the CPE device is a Cisco 800 Series Router, block 208 involves storing the E.164 address of the ISDN line in a device ID object that is stored internally by the device. The device ID object stores a unique identifier that the device uses to identify itself to other devices, applications and systems, and may be reset within the device using appropriate software instructions.

In block 210, the CPE device connects to the service provider using the primary signaling technology. For example, in FIG. 1, CPE device 102 establishes an ADSL connection to service provider network 108 through broadband access network 106. The CPE device 102 can contact the service provider network 108 because the generic configuration that is pre-loaded into the CPE device, prior to shipment to the customer premises, includes a network address of a configuration server in the service provider network. Thus, in block 210 the CPE device 102 can use the fixed IP address for configuration server 110 to reach the configuration server.

In block 212, the CPE device registers its unique identifier with a configuration server in the service provider network. Continuing with the example, CPE device 102 provides its unique identifier to configuration server 110.

Elements of the service provider network receive the unique identifier and may perform several types of processing. In one embodiment, configuration server 110 receives the unique identifier from CPE device 102 and queries a database 140 or other repository of configuration information to determine which individual configuration is associated with the particular CPE device. Configuration server 110 retrieves the selected individual configuration from storage and provides the individual configuration to the CPE device 102 through the broadband network. As a result, CPE device 102 receives only a particular individual configuration that is appropriate for it or for its associated user.

This processing may include authenticating the unique identifier that has been provided by the CPE device. For example, in one specific approach in which the service provider provides both conventional or basic ISDN service and ADSL over ISDN service, the unique identifier is an ISDN line phone number, and each user ID for each authorized user or subscriber to the service provider network 108 contains that user's ISDN line phone number. Because the service provider provides basic ISDN service, the service provider can associate the true ISDN line phone number with an ADSL user name at the time that the user requests ADSL service.

Thus, for example, an ISDN line phone number might be "650-555-1212" and a user ID for an authorized user of the premises that include that phone number might be "john_smith_6505551212." In this approach, the service provider can determine the correct individual configuration for the CPE device by querying a database table of user IDs using the received unique identifier as a lookup value. This query is considered reliable because network elements under the custody and control of the service provider, such as PSTN switches that provide ISDN switching, are considered to reliably provide the ISDN line phone number in response to a Q.931 calling line identifier request.

In another approach, in which the phone number does not form a part of the user ID, the phone number is stored in a first field of a user record in a database or other repository, and a second field of the record holds a corresponding user ID, configuration ID, or other information that can be used to select the correct individual configuration. This approach may be used where broadband network service, such as ADSL, is provided by a first service provider and the physical phone lines to a customer premises are provided by a second, different service provider. In this situation, the first service provider can obtain the phone number for the customer premises from the end user at the time that the user orders broadband service, or from the second service provider. The first service provider then enters the phone number received from the end user into its database in association with a user ID.

The individual configuration that is received by the CPE device 102 may include individual authentication information that is sufficient to enable a user to reach protected resources in the service provider network 108 or in an enterprise network that is accessed through the service provider network. For example, the individual configuration can include an individual username and password that can be used in PPPoE authentication for the device to gain access to protected resources or networks. Importantly, such information that is critical to network security is provided to the CPE device only after the service provider has authenticated the CPE device based on its unique link identifier.

To support this operation, the database is pre-loaded with tables of information that associate a plurality of identifiers, such as ISDN phone numbers, with individual configuration identifiers or filenames. Storage associated with the service provider is pre-loaded with individual configuration files that contain the individual configurations for the anticipated CPE devices.

Additionally or alternatively, configuration server 110 determines, based on the unique identifier and based on information in a database or other repository, whether the CPE device 102 is present at the correct user.

The registration step of block 212 may involve sending a message that includes other information identifying the CPE device, such as its hardware serial number, device type, current operating system version, etc.

In block 214, the CPE device initiates in-service operation. Either block 212 or block 214 may involve applying the individual configuration to the CPE device, which enables the CPE device to reach needed resources in the service provider network.

FIG. 3A is a flow diagram that illustrates a second embodiment of a method for configuring network devices. FIG. 3A shows an embodiment from the perspective of a CPE device. Thus, the steps in FIG. 3A may be performed by software instructions executed within CPE device 102 of FIG. 1.

In block 302, power-on and startup is performed. In block 304, the CPE device verifies that it has an active network link that uses a primary signaling technology and a secondary signaling technology. Block 304 may involve performing interface tests or requesting hardware elements of the CPE device to verify that signaling is operative in the primary signaling technology and secondary signaling technology.

In block 306, the CPE device obtains a network link identifier using the secondary signaling technology. Block 306 may involve performing the steps described above with respect to block 206. In block 308, the CPE device registers the link identifier as a unique identifier for the CPE device. Block 308 may involve performing the steps described above with respect to block 208. In block 310, the CPE device connects to the service provider network using the primary signaling technology.

Block 310 may involve performing the steps described above with respect to block 210. In block 312, the CPE device registers its unique identifier with the configuration server of the service provider network. Block 312 may involve performing the steps described above with respect to block 212. In block 314, the CPE device initiates in-service operation. Block 314 may involve performing the steps described above with respect to block 214.

Figure 3B:
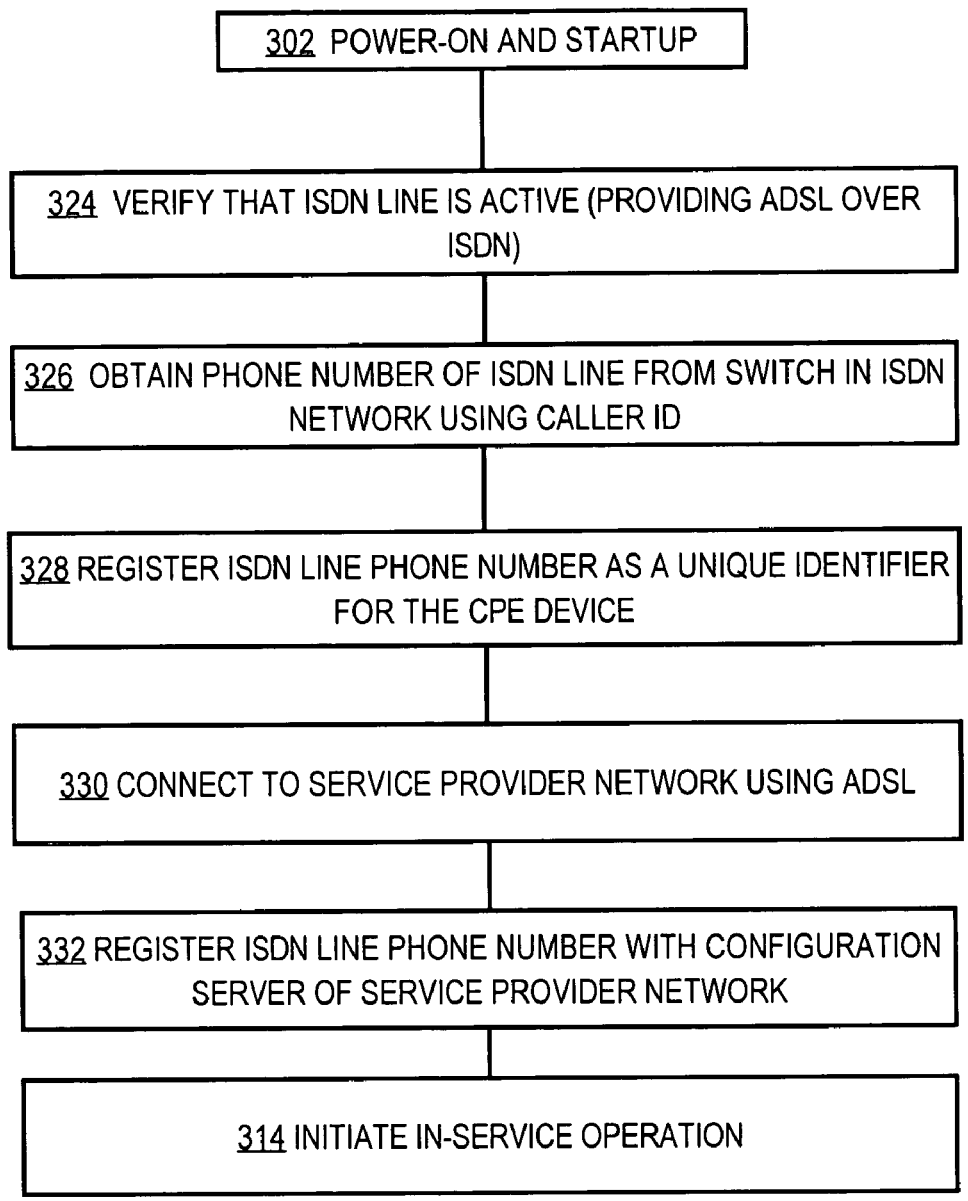
FIG. 3B is a flow diagram that illustrates a third embodiment of a method for configuring network devices.

FIG. 3B is a flow diagram that illustrates a third embodiment of a method for configuring network devices. Generally, FIG. 3B shows the process of FIG. 3A, as implemented in the specific context of ADSL over ISDN. In block 302, a CPE device performs startup functions. In block 324, the CPE device verifies that an ISDN line and ADSL line connected to the CPE device are active. In block 326, the CPE device obtains the phone number of the ISDN line from a switch in the ISDN PSTN network, using caller ID techniques. In block 328, the CPE device registers the ISDN line phone number as a unique identifier for the CPE device.

In block 330, the CPE device connects to the service provider network using the ADSL link. The CPE device may make such a connection using a static IP address of a configuration server that forms part of a generic configuration that is pre-loaded in the CPE device. In block 332, the CPE device registers the ISDN line phone number with the configuration server of the service provider network. Block 332 may be viewed as a request by the CPE device to authenticate itself to the service provider network. The configuration server or other elements of the service provider network may authenticate the CPE device based on the ISDN phone number using any appropriate authentication mechanism. For example, the service provider network may use the database query mechanism that is described above for FIG. 2.

In block 334, the CPE device receives and applies an individual configuration that has been selected for it based on the ISDN line phone number that it registered. The individual configuration includes one or more specific commands or parameter values that are appropriate for the CPE device that has authenticated.

In block 314, the CPE device initiates in-service operation.

Accordingly, a method of configuring network devices has been described. Service providers may use the approaches herein to achieve high-volume deployment of CPE network devices without human intervention with respect to providing an individual configuration to the devices.

Figure 4A:
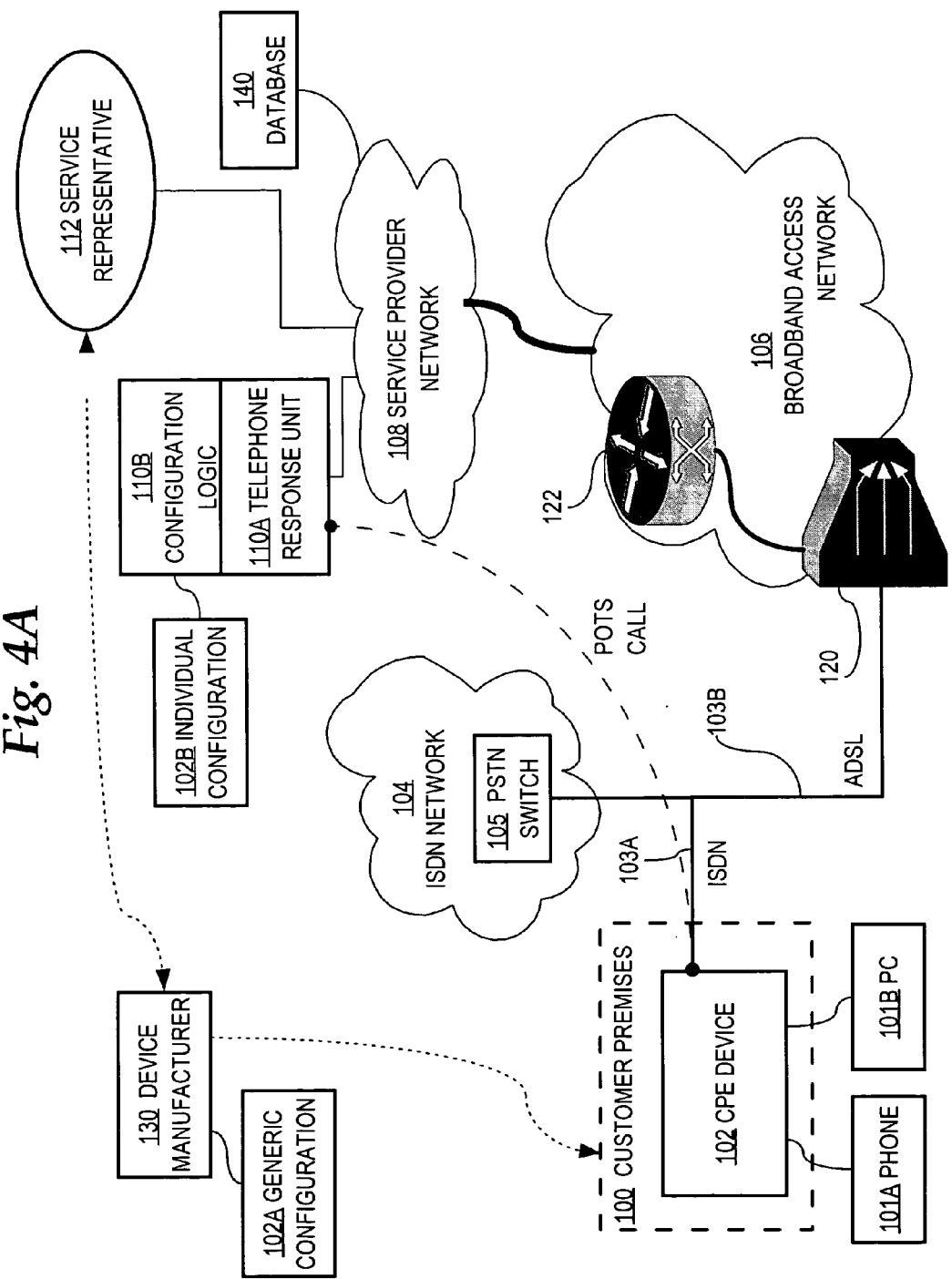
FIG. 4A is a block diagram of an alternative network context in which an embodiment may be used.
Figure 4B:
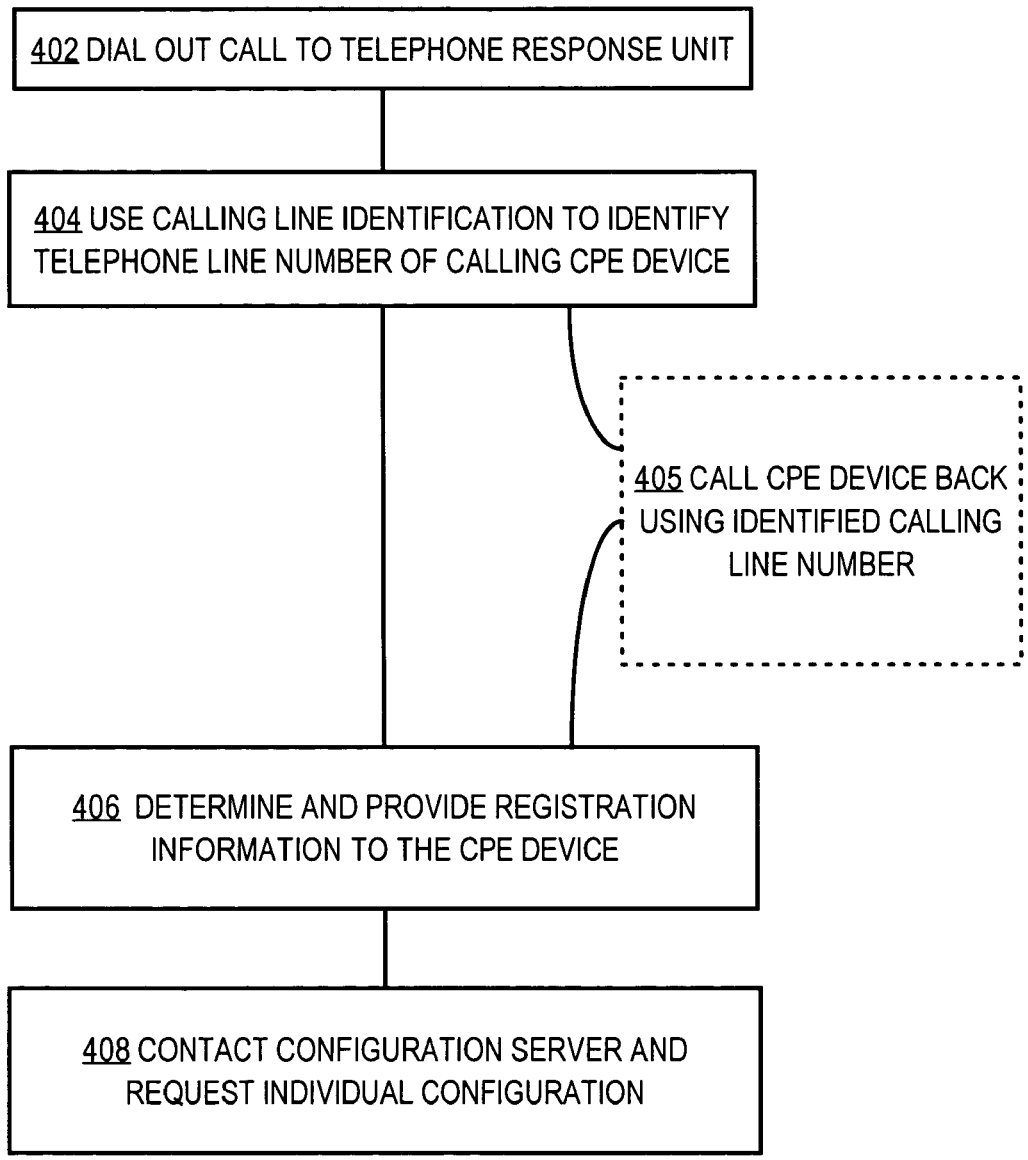
FIG. 4B is a flow diagram that illustrates a further embodiment of a method for configuring network devices.

FIG. 4A is a block diagram of an alternative network context in which an embodiment may be used; FIG. 4B is a flow diagram that illustrates a further embodiment of a method for configuring network devices in the context of FIG. 4A.

Referring first to FIG. 4A, configuration server 110 of service provider network 108 comprises a telephone response unit 110A that is communicatively coupled to a plain old telephone system (POTS) network 104A and can respond to telephone calls that are placed through the POTS to the configuration server. The telephone response unit 110A is communicatively coupled to, or integrated with, a configuration logic 110B of the configuration server. Thus, this arrangement is appropriate for a network context in which ISDN is not used and ADSL service is provided over POTS lines by the service provider. The configuration server 110 is reachable through the POTS using one or more specified telephone numbers that may be stored in the generic configuration 102A of the CPE device 102 using appropriate software instructions within an application executed by the CPE device.

In this arrangement, CPE device 102 may authenticate itself by calling the telephone response unit 110A, and then receive its individual configuration 102B from configuration logic 110B. Referring now to FIG. 4B, in block 402, the CPE device dials out a call to the telephone response unit. For example, after installation, cabling and power-up of the CPE device, the telephony port of the CPE device out-dials to a specified telephone number, which might be a toll-free number, associated with the telephone response unit and stored in the generic configuration of the CPE device.

In block 404, the telephone response unit 110A uses calling line identification or Caller ID to identify a telephone line number of the calling CPE device. The telephone response unit 110A provides the identified telephone line number to configuration logic 110B.

In block 406, based on the calling line identifier, the configuration logic determines and provides registration information back to the CPE device. The registration information may passed from the first configuration server 110A to the CPE device 102 using a modem or DTMF tones. The registration information may include a network address for use by the CPE device, such as an IP address. Further, in embodiments in which the telephone response unit is separate from the configuration server, the registration information may include the IP address of the configuration server or other configuration management device.

Additionally or alternatively, as part of block 406 or another step, the CPE device 102 may send other identifying information to the telephone response unit 110A, via modem or DTMF. The other identifying information may include the CPE device serial number, MAC address, etc. The configuration logic 110B may use this other identifying information as additional key fields to determine which registration information to give back to the CPE device.

In embodiments in which the telephone response unit 110A and configuration server are separate, in block 408, the CPE device contacts the configuration server and requests an individual configuration. In this approach, authentication at the configuration server is not required because the CPE device can obtain the network address of the configuration server only by first calling the telephone response unit, which determines the identity of the CPE device by obtaining the calling party identifier. A database 140 may associate CPE identity information with calling party identifiers or phone numbers.

In another alternative embodiment, as indicated by optional block 405, the telephone response unit 110A places a call back to the CPE device based on the received calling party number that was identified in block 404. Telephone response unit 110A may perform the callback in cooperation with configuration logic 110B or independently. As part of block 405, the first configuration server may provide configuration information to the CPE device within the caller-id name field of the return call. Alternatively, the configuration information is provided by modem after appropriate connection and handshaking, or by DTMF tones. Using the call-back approach also provides a security enhancement. For example, this approach can prevent an attack in which a forged calling line identifier is provided to the telephone response unit.

3.0 Implementation Mechanisms—Hardware Overview

Figure 5:
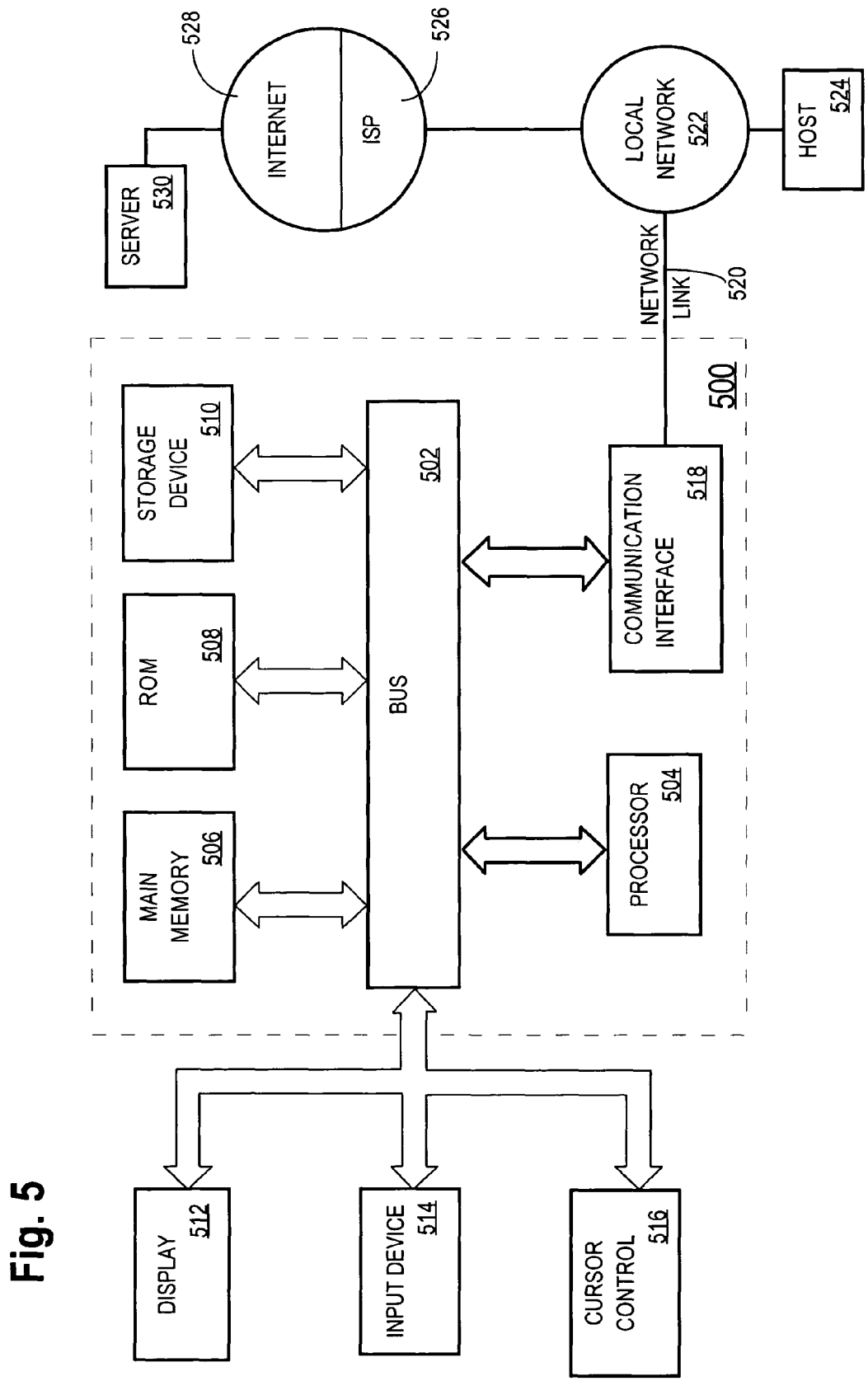
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for authenticating or configuring a network device. According to one embodiment of the invention, configuring a network device is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for authenticating or configuring a network device as described herein.

Processor 504 may execute the received code as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of authenticating a network device, comprising the computer-implemented steps of:
   determining that a network link that uses a primary signaling technology and a secondary signaling technology is coupled to the network device;
   obtaining, using the secondary signaling technology, a unique link identifier that is associated with the network link using the secondary signaling technology;
   establishing the unique link identifier as a unique device identifier; and
   authenticating the network device to a service provider by communicating the unique device identifier to the service provider over the network link using the primary signaling technology.

2. A method as recited in claim 1, further comprising the steps of receiving a configuration from the service provider over the network link using the primary signaling technology.

3. A method as recited in claim 1, wherein the secondary signaling technology is integrated services digital network (ISDN) signaling.

4. A method as recited in claim 1, wherein the secondary signaling technology is ISDN, and wherein the unique link identifier is a telephone number associated with an ISDN line coupled to the network device.

5. A method as recited in claim 1, wherein the secondary signaling technology is ISDN, and wherein the obtaining step comprises obtaining a telephone number associated with an ISDN line coupled to the network device using a caller ID function.

6. A method as recited in claim 1, wherein the network device is a residential broadband router, wherein the primary signaling technology is asynchronous digital subscriber line (ADSL), and wherein the secondary signaling technology is ISDN.

7. A method as recited in claim 1, wherein the network device is a residential broadband router, wherein the primary signaling technology is ADSL, wherein the secondary signaling technology is ISDN, and wherein the unique link identifier is a telephone number associated with an ISDN line.

8. A method as recited in claim 7, wherein the step of registering the network device with a service provider comprises using the ADSL line to connect to a Cisco Intelligent Engine 2100 (IE2100) device associated with the service provider, and providing the unique device identifier to the IE2100.

9. A method as recited in claim 1, wherein the step of registering the network device with a service provider comprises using the primary signaling technology to connect to a configuration server associated with the service provider, and providing the unique device identifier to the configuration server.

10. A method of authenticating a broadband customer premises network device that is communicatively coupled to an ISDN line that supports ADSL over ISDN, the method comprising the computer-implemented steps of:
    obtaining, using the ISDN line, an ISDN telephone number uniquely associated with the ISDN line;

establishing the ISDN telephone number as a unique identifier of the broadband customer premises network device; and authenticating the network device to a broadband network service provider by providing the unique identifier to the service provider using ADSL communication over the ISDN line.

11. A method as recited in claim 10, further comprising the steps of receiving a configuration from the service provider.

12. A method as recited in claim 10, wherein the obtaining step comprises obtaining a telephone number associated with the ISDN line using a caller ID function.

13. A method as recited in claim 10, wherein the step of registering the network device with the service provider comprises using ADSL over ISDN to connect to a Cisco Intelligent Engine 2100 (IE2100) device associated with the service provider, and providing the unique device identifier to the IE2100.

14. A method of deploying a network device, comprising the steps of:
receiving a customer premises equipment (CPE) device at a customer premises;
coupling a network link that supports a primary signaling technology and a secondary signaling technology to the network device;
obtaining, using the secondary signaling technology, a unique link identifier associated with the network link;
establishing the unique link identifier as a unique identifier of the CPE device;
connecting to a network service provider using the primary signaling technology;
authenticating the CPE device to a service provider by providing the unique device identifier over the network link using the primary signaling technology; and
receiving, from the service provider, a configuration for the CPE device over the network link.

15. A computer-readable medium carrying one or more sequences of instructions for authenticating a network device, which instructions, when executed by one or more processors, cause the one or more processors to carry out the steps of:
determining that a network link that uses a primary signaling technology and a secondary signaling technology is coupled to the network device;
obtaining, using the secondary signaling technology, a unique link identifier that is associated with the network link using the secondary signaling technology;
establishing the unique link identifier as a unique device identifier; and
authenticating the network device to a service provider by communicating the unique device identifier to the service provider over the network link using the primary signaling technology.

16. A computer-readable medium as recited in claim 15, further comprising the steps of receiving a configuration from the service provider.

17. A computer-readable medium as recited in claim 15, wherein the secondary signaling technology is ISDN.

18. A computer-readable medium as recited in claim 15, wherein the secondary signaling technology is ISDN, and wherein the unique link identifier associated with the secondary telecommunication link is a telephone number associated with an ISDN line.

19. A computer-readable medium as recited in claim 15, wherein the secondary signaling technology is ISDN, and wherein the obtaining step comprises obtaining a telephone number associated with an ISDN line using a caller ID function.

20. A computer-readable medium as recited in claim 15, wherein the network device is a residential broadband router, and wherein the primary signaling technology is ADSL.

21. A computer-readable medium as recited in claim 15, wherein the network device is a residential broadband router, wherein the primary signaling technology is ADSL, wherein the secondary signaling technology is ISDN, and wherein the unique link identifier associated with the secondary telecommunication link is a telephone number associated with an ISDN line.

22. A computer-readable medium as recited in claim 21, wherein the step of registering the network device with a service provider comprises using ADSL to connect to a Cisco Intelligent Engine 2100 (IE2100) device associated with the service provider, and providing the unique device identifier to the IE2100.

23. A computer-readable medium as recited in claim 15, wherein the step of registering the network device with a service provider comprises using the primary signaling technology to connect to a configuration server associated with the service provider, and providing the unique device identifier to the configuration server.

24. An apparatus for configuring a network device, comprising:
means for determining that a network link that uses a primary signaling technology and a secondary signaling technology is coupled to the network device;
means for obtaining, using the secondary signaling technology, a unique link identifier that is associated with the network link using the secondary signaling technology;
means for establishing the unique link identifier as a unique device identifier; and
means for authenticating the network device to a service provider by communicating the unique device identifier to the service provider over the network link using the primary signaling technology.

25. An apparatus as recited in claim 24, further comprising:
means for receiving a configuration from the service provider over the primary network link; and
means for initiating in-service operation.

26. An apparatus as recited in claim 24, wherein the secondary signaling technology is ISDN.

27. An apparatus as recited in claim 24, wherein the secondary signaling technology is ISDN, and wherein the unique link identifier associated with the secondary signaling technology is a telephone number associated with an ISDN line.

28. An apparatus as recited in claim 24, wherein the secondary signaling technology is ISDN, and wherein the obtaining means comprises means for obtaining a telephone number associated with the ISDN line using a caller ID function.

29. An apparatus as recited in claim 24, wherein the network device is a residential broadband router, and wherein the primary signaling technology is ADSL.

30. An apparatus as recited in claim 24, wherein the network device is a residential broadband router, wherein the primary signaling technology is ADSL, wherein the secondary signaling technology is ISDN, and wherein the unique link identifier associated with the secondary signaling technology is a telephone number associated with an ISDN line.

31. An apparatus as recited in claim 30, wherein the step of registering the network device with a service provider comprises using ADSL to connect to a Cisco Intelligent Engine 2100 (IE2100) device associated with the service provider, and providing the unique device identifier to the IE2100.

32. An apparatus as recited in claim 24, wherein the registering means comprises means for using the primary signaling technology to connect to a configuration server associated with the service provider, and for providing the unique device identifier to the configuration server.

33. An apparatus for configuring a network device, comprising:
a network interface that is coupled to the data network for receiving one or more packet flows therefrom;
a processor;
one or more stored sequences of instructions which, when executed by the processor, cause the processor to carry out the steps of:
determining that a network link that uses a primary signaling technology and a secondary signaling technology is coupled to the network device;
obtaining, using the secondary signaling technology, a unique link identifier that is associated with the network link using the secondary signaling technology;
establishing the unique link identifier as a unique device identifier; and
authenticating the network device to a service provider by communicating the unique device identifier to the service provider over the network link using the primary signaling technology.

34. An apparatus as recited in claim 33, further comprising the steps of receiving a configuration from the service provider.

35. An apparatus as recited in claim 33, wherein the secondary signaling technology is ISDN.

36. An apparatus as recited in claim 33, wherein the secondary signaling technology is ISDN, and wherein the unique link identifier associated with the secondary signaling technology is a telephone number associated with an ISDN line.

37. An apparatus as recited in claim 33, wherein the secondary signaling technology is ISDN, and wherein the obtaining step comprises obtaining a telephone number associated with an ISDN line using a caller ID function.

38. An apparatus as recited in claim 33, wherein the network device is a residential broadband router, and wherein the primary signaling technology is ADSL.

39. An apparatus as recited in claim 33, wherein the network device is a residential broadband router, wherein the primary signaling technology is ADSL, wherein the secondary signaling technology is ISDN, and wherein the unique link identifier associated with the secondary signaling technology is a telephone number associated with an ISDN line.

40. An apparatus as recited in claim 33, wherein the step of registering the network device with a service provider comprises using the ADSL line to connect to a Cisco Intelligent Engine 2100 (IE2100) device associated with the service provider, and providing the unique device identifier to the IE2100.

41. An apparatus as recited in claim 33, wherein the step of registering the network device with a service provider comprises using the primary signaling technology to connect to a configuration server associated with the service provider, and providing the unique device identifier to the configuration server.

* * * * *